United States Patent
Sundar et al.

(12)

(10) Patent No.: US 6,416,704 B1
(45) Date of Patent: *Jul. 9, 2002

(54) NYLON MOLDING COMPOSITIONS HAVING IMPROVED SURFACE APPEARANCE

(75) Inventors: Rajendra A. Sundar, Morristown; Clark W. Smith, Wayne; Thomas J. Krolick, Sayreville, all of NJ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/384,708

(22) Filed: Aug. 26, 1999

(51) Int. Cl.$^7$ ............................................. C08L 77/00
(52) U.S. Cl. ...................... 264/328.1; 524/538; 525/432
(58) Field of Search ..................... 525/432; 524/538; 264/328.1

(56) References Cited

U.S. PATENT DOCUMENTS

| | | | |
|---|---|---|---|
| 4,683,170 A | 7/1987 | Tse et al. | 428/349 |
| 4,945,129 A | 7/1990 | Mason et al. | 525/66 |
| 5,206,309 A | 4/1993 | Altman | 525/432 |

FOREIGN PATENT DOCUMENTS

| | | |
|---|---|---|
| EP | 0 170 385 | 2/1986 |
| EP | 0 358 038 | 3/1990 |
| WO | WO 92/15641 | 9/1992 |
| WO | WO 99/46334 | 9/1999 |

*Primary Examiner*—Ana Woodward
(74) *Attorney, Agent, or Firm*—Roger H. Criss

(57) ABSTRACT

The invention relates to nylon compositions having improved surface aesthetics while maintaining its physical properties and to a method for preparing molded articles of from such nylon compositions. The nylon composition is composed of a substantially uniform blend of nylon 6,6,6 copolymer of from about 65 to about 75 parts by weight of caprolactam and from about 25 to about 35 parts by weight of hexamethylenediamine and adipic acid in a 1:1 ratio; together with a second polyamide which is nylon 6 homopolymer. The first polyamide is present in the overall composition in an amount of from about 7 to about 20 weight percent and said second polyamide is present in the overall composition in an amount of from about 80 to about 83 weight percent. The nylon compositions are useful to create injection molded articles having a good surface appearance and good performance at a low cost.

20 Claims, No Drawings

NYLON MOLDING COMPOSITIONS HAVING IMPROVED SURFACE APPEARANCE

BACKGROUND OF THE INVENTION

1. Field of the Invention

The present invention relates to nylon compositions having improved surface aesthetics. More particularly, the invention pertains to nylon compositions of containing a nylon 6 homopolymer and a nylon-6,6,6 copolymer which has improved surface qualities while maintaining its physical properties. The invention also pertains to a method for preparing molded articles of from such nylon compositions. Nylons formed herein are useful to create injection molded articles having a good surface appearance and good performance at a low cost.

2. Description of the Related Art

It is known in the art to prepare blends of nylon homopolymers and copolymers. Typically, nylons are used to manufacture molded articles having good properties such as hardness, high tensile strength, toughness and aesthetics. The clarity of nylons, combined with the ease of molding them into articles of various shapes and surface textures, have resulted in many practical uses of nylons. However, when a nylon composition is modified to improve surface quality, the physical properties are often compromised. Properties such as cavity pressures, mold temperatures, cycle times and cooling times are affected, resulting in a greater production cost. Therefore, it has long been of interest to improve the appearance of a nylon while maintaining its strong physical properties.

Many attempts have been made to improve the various properties of a nylon composition through blending certain nylon homopolymers and copolymers. For example, U.S. Pat. No. 4,683,170 teaches a blend of nylon polymers which is used to form single and multilayer films. The nylon composition has low temperature extrusion processability and high heat resistance for heat sealing operations. U.S. Pat. No. 4,945,129 teaches certain polyamide compositions of which are combinations of nylon polymers and copolymer. The nylon composition has high impact strength and good toughness at low temperatures.

These references t each certain blends of nylon polymers, but do not teach the specific blend of a nylon 6 homopolymer with a nylon 6,6,6 copolymer having the characteristics of the present invention which include good surface appearance. The present invention solves the problems in the prior art by teaching a nylon composition useful for molding articles with good surface appearance and good performance at a low cost.

SUMMARY OF THE INVENTION

The invention provides a nylon composition comprising a substantially uniform blend of:
  a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
  b) a second polyamide which is nylon 6 homopolymer, wherein the composition comprises from about 7 to about 20 weight percent of said first polyamide and from about 80 to about 83 weight percent of said second polyamide.

The invention also provides a nylon article comprising a substantially uniform blend of:
  a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
  b) a second polyamide which is nylon 6 homopolymer, wherein the composition comprises from about 7 to about 20 weight percent of said first polyamide and from about 80 to about 83 weight percent of said second polyamide.

The invention further provides a method of forming a molded article comprising:
  i) forming a substantially uniform, molten nylon composition comprising a mixture of
    a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
    b) a second polyamide which is nylon 6 homopolymer, wherein the composition comprises from about 7 to about 20 weight percent of said first polyamide and from about 80 to about 83 weight percent of said second polyamide; and
  ii) molding said nylon composition to form an article.

DETAILED DESCRIPTION OF THE PREFERRED EMBODIMENT

In the present invention, a substantially uniform nylon composition is prepared by blending a first polyamide of a nylon 6,6,6 copolymer and a second polyamide of poly (caprolactam) (nylon 6) homopolymer. The nylon 6,6,6 copolymer (also sometimes referred to as nylon 6/66) is prepared through a condensation reaction of caprolactam, hexamethylene diamine and adipic acid by techniques well known in the art. Preferably, the nylon 6,6,6 copolymer comprises from about 65 to about 75 parts by weight of nylon 6 and from about 25 to about 35 by weight of nylon 6,6. More preferably, the nylon 6,6,6 copolymer comprises from about 68 to about 72 parts by weight of nylon 6 and from about 28 to about 32 parts by weight of nylon 6,6, and most preferably from about 69 to about 71 parts by weight of nylon 6 and from about 29 to about 31 parts by weight of nylon 6,6. This copolymer is also referred to as poly (caprolactamhexamethylene adipamide).

The nylon 6 homopolymer is prepared through a condensation of caprolactam by techniques well known in the art. The nylon 6,6,6 copolymer is prepared by condensing from about 65 to about 75 weight percent of caprolactam and from about 25 to about 35 weight percent of hexamethylenediamine and adipic acid in a 1:1 ratio. General procedures useful for the preparation of polyamides are well known to the art, and the details of their formation are described under the heading "Polyamides" in the Encyclopedia of Polymer Science and Technology, published by John Wiley & Sons, Inc, Vol. 10, pps.487–491, (1969).

The polyamides used in the practice of this invention may be obtained from commercial sources or prepared in accordance with known preparatory techniques. For example, nylon 6 can be obtained from AlliedSignal Inc., Morristown, N.J. under the trademark CAPRON®. Suitable variants of CAPRON® nylon resins for use in the present invention include CAPRON® nylon 8200, a balanced nylon 6 having a formic acid viscosity (FAV) of 75, CAPRON® nylon 8202, a balanced nylon 6 having an FAV of 45, CAPRON® nylon 1767, a balanced nylon 6 having an FAV of 35, CAPRON® nylon 8224HSL, a balanced nylon 6 containing a lubricant and a heat stabilizer, and having an FAV of 60, and CAPRON® nylon 1250, an amine-terminated nylon 6 with a FAV of 60.

The number average molecular weight of each polyamide homopolymer or copolymer may vary widely. Such are sufficiently high to form a free standing film but sufficiently low to allow melt processing of the blend. Such number average molecular weights are well known to those of skill in the film forming art and are usually at least about 5,000 as determined by gel permeation chromatography (GPC). Another measure of molecular weight is by the FAV method (ASTM D-789). This method provides a means of quickly determining molecular weight and can be comparable to the molecular weight as determined by the GPC method. In this method, a solution of 11 grams of aliphatic polyamide in 100 ml of 90% formic acid at 25° C. is used. In the preferred embodiments of the invention, the number average molecular weight of each polyamide ranges from about 5,000 to about 100,000, and in the preferred embodiment it ranges between about 10,000 to about 60,000. Most preferred are those in which the number average molecular weight of each polyamide ranges from about 20,000 to about 40,000.

The weight percent of the first polyamide in the nylon composition ranges from about 7 percent to about 20 percent. More preferably the weight percent the first polyamide in the nylon composition ranges from about 10 percent to about 18 percent.

The weight percent of the second polyamide in the nylon composition ranges from about 80 percent to about 83 percent. More preferably the weight percent of the second polyamide in the nylon composition ranges from about 10 percent to about 18 percent.

The composition may be formed by dry blending solid particles or pellets of each of the polyamide components and then melt blending the mixture in a suitable mixing means such as an extruder, a roll mixer or the like. Alternatively, the composition may be formed by melting each of the polyamide compositions and then mixing them to form a substantially uniform nylon composition.

Typical melting temperatures range from about 175° C. to about 260° C., preferably from about 215° C. to about 225° C., and more preferably from about 220° C. to about 223° C. Blending is conducted for a period of time required to attain a substantially uniform blend. Such may easily be determined by those skilled in the art. If desired, the composition may be cooled and cut into pellets for further processing. For example, it may be extruded into a fiber, a filament, or a shaped element or it may be formed into films and optionally uniaxially or biaxially stretched by means well known in the art.

The compositions of this invention may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators, plasticizers, as well as other conventional additives known to the art. These conventional additives may be incorporated into compositions at any suitable stage of the production process, and typically are introduced in the mixing step and included in an extrudate. If included, a filler may comprise about 7 to about 50 weight percent but preferably 10 weight percent or less based on the weight of the overall composition.

By way of example, representative ultraviolet light stabilizers include various substituted resorcinols, sasalicylates, benzotriazole, benzophenones, and the like. Suitable exemplary lubricants and mold release agents include stearic acid, stearyl alcohol, stearamides. Exemplary flame-retardants include organic halogenated compounds, including decabromodiphenyl ether and the like. Suitable coloring agents including dyes and pigments include cadmium sulfide, cadmium selenide, titanium dioxide, phthalocyanines, ultramarine blue, nigrosine, carbon black and the like.

Representative oxidative and thermal stabilizers include the Period Table of Elements Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Suitable fillers include inorganic fillers, including those of fibrous and granular nature, as wells as mixtures thereof. The fibrous fillers include glass, silica glass, ceramic, asbestos, alumina, silicon carbide, gypsum, metal (including stainless steel) as well as other inorganic and carbon fibers. The granular fillers include wollastonite, sericite, asbestos, talc, mica, clay, kaolin, bentonite, and silicates, including alumina silicate.

Other granular fillers include metal oxides, such as alumina, silica, magnesium oxide, zirconium oxide, titanium oxide. Further granular fillers include carbonates such as calcium carbonate, magnesium carbonate, and dolomite, sulfates including calcium sulfate and barium sulfate, boron nitride, glass beads, silicon carbide, silicon as well as other materials not specifically denoted here. These fillers may be hollow, for example glass microspheres, silane balloon, carbon balloon, and hollow glass fiber.

Preferred inorganic fillers include glass fibers, carbon fibers, metal fibers, potassium titanate whisker, glass beads, glass flakes, wollastonite, mica, talc, clay, titanium oxide, aluminum oxide, calcium carbonate and barium sulfate. Particularly, glass fiber is most preferred. The inorganic fillers should preferably be treated with silane, titanate, or another conventional coupling agent, and glass fibers should preferably be treated with an epoxy resin, vinyl acetate resin or other conventional converging agent.

The invention also provides a nylon article comprising a substantially uniform blend of the first and second polyamides. The article is preferably formed into a molded article through a molding process, such as injection molding, which is well known in the art. An injection molding process softens the thermoplastic nylon blend in a heated cylinder, injecting it while molten under high pressure into a closed mold, cooling the mold to induce solidification, and ejecting the molded article from the mold.

The following non-limiting examples serve to illustrate the invention.

EXAMPLES 1 (COMPARATIVE) AND 2

A control formulation containing nylon-6 (58%), chopped glass fiber (35%), and additives and colorants (7%) was weighed and dry blended. A second formulation containing nylon-6 (44%), chopped glass fiber (35%), additives and colorants (7%), with an additional ingredient, 14% of nylon-6,6,6 (produced from 70 weight percent caprolactam and 30 weight percent of hexamethylenediamine and adipic acid in a 1:1 ratio) was weighed up and dry blended. Following dry blending, the ingredients were all fed into the throat of a 40 mm twin screw extruder, and the glass was fed downstream in extruder zone 6. The temperature profile for extruder zones 1 to zone 10, rates, RPM, and torques, related to processing of these materials are listed in Table 1 (Processing Conditions) under headings of column 1 and 2. The extrudate from the twin screw machine was water quenched in an ambient water bath, air cooled, conveyed, and cut into pellets. The pellets were then dried overnight in a 49° C. oven and molded. A cover shield tool was used to evaluate the compositions for surface enhanced features. This tool/part is approximately 19 cm long, and have wall thicknesses of approx 0.16 cm. This tool is of sufficient discrimination so that parts that have better flow and surfaces can be seen readily. In this tool the composition containing the nylon 6,6,6 resin showed better surface, as envisioned by lesser degree of surface imperfections and glass, and also better flow, as can be seen by the extent of the filling. The molded part shows better appearance from a surface and mold filling perspective. The part was molded on a Van Dom 170 ton machine and the molding conditions are listed in Table 2 (Molding Conditions) under columns 1 and 2. The dry as molded physical properties obtained for these formulations are listed in Table 3 under columns 1 and 2.

EXAMPLES 3 (COMPARATIVE) AND 4

A formulation containing nylon-6 (58%), chopped glass fiber (35%), and additives and colorants (7%) was weighed up and dry blended. Another formulation containing nylon-6 (44%), chopped glass fiber (35%), additives and colorants (7%), with an additional ingredient, 14% of nylon-6,6,6 (produced from 70 weight percent caprolactam and 30 weight percent of hexamethylenediamine and adipic acid in a 1:1 ratio) was weighed up and dry blended. This experiment uses a different chopped glass fiber than is listed in Example 1 above. Following dry blending, the ingredients were all fed into the throat of a 40 mm twin screw extruder, and the glass was fed downstream in extruder zone 6. The temperature profile for extruder zones 1 to zone 10, rates, RPM, and torques, related to processing of these materials are listed in Table 1 (Processing Conditions) under headings of column 3 and 4. The extrudate from the twin screw machine was water quenched in an ambient water bath, air cooled, conveyed, and cut into pellets. The pellets were then dried overnight in a 49° C. oven and molded. A cover shield tool was used to evaluate the compositions for surface enhanced features, as in Examples 1 and 2. In this tool the composition containing the nylon 6,6,6 resin showed better surface, as envisioned by lesser degree of surface imperfections and glass, and also better flow, as can be seen by the extent of the filling. The formulation containing the nylon 6,6,6 showed better filling and surface, which can be correlated to the fill times listed in the molding conditions table. The part was molded on a Van Dom 170 ton machine and the molding conditions are listed in Table 2 (Molding Conditions) under columns 3 and 4. The dry as molded physical properties obtained for these formulations are listed in Table 3, under the columns 3 and 4.

EXAMPLE 5 (COMPARATIVE) AND 6 (COMPARATIVE)

A formulation containing nylon-6 (58%), chopped glass fiber (35%), and additives and colorants (7%) was weighed up and dry blended (as in Example 1). Another formulation containing nylon-6 (44%), chopped glass fiber (35%), additives and colorants (7%), with an additional ingredient, 14% of nylon-6,6,6 (produced from 85 weight percent caprolactam and 15 weight percent of hexamethylenediamine and adipic acid in a 1:1 ratio) and dry blended. This nylon 6,6,6 is not within the scope of the invention. Following dry blending, the ingredients were all fed into the throat of a 40 mm twin screw extruder, and the glass was fed downstream in extruder zone 6. The temperature profile for zones 1 to zone 10, rates, RPM, and torques, related to processing of these materials are listed in Table 1 (Processing Conditions) under headings of columns 1 and 5. The extrudate from the twin screw machine was water quenched in an ambient water bath, air cooled, conveyed, and cut into pellets. The pellets were then dried overnight in a 49° C. oven and molded. A cover shield tool was used to evaluate the compositions for surface enhanced features, as in Examples 1 and 2. The improvements of the invention were not observed in these formulations, and can be reflected in the fill times. The part was molded on a Van Dorn 170 ton machine and the molding conditions are listed in Table 2 (Molding Conditions) under columns 1 and 5. The dry as molded physical properties obtained for these formulations are listed in Table 3, under the columns 1 and 5.

TABLE 1

(Processing Conditions)

| | 1 | 2 | 3 | 4 | 5 |
|---|---|---|---|---|---|
| Zone 1 (° C.) | 240 | 240 | 240 | 240 | 240 |
| Zone 2 (° C.) | 240 | 238 | 248 | 250 | 251 |
| Zone 3 (° C.) | 240 | 235 | 243 | 240 | 238 |
| Zone 4 (° C.) | 260 | 260 | 260 | 260 | 261 |
| Zone 5 (° C.) | 270 | 269 | 271 | 270 | 268 |
| Zone 6 (° C.) | 268 | 270 | 270 | 270 | 271 |
| Zone 7 (° C.) | 271 | 270 | 271 | 271 | 270 |
| Zone 8 (° C.) | 280 | 280 | 279 | 280 | 282 |
| Zone 9 (° C.) | 280 | 280 | 280 | 280 | 284 |
| Zone 10 (° C.) | 280 | 280 | 280 | 280 | 280 |
| Melt Temp (° C.) | 310 | 290 | 280 | 284 | 283 |

TABLE 2

(Molding Conditions)

| | 1 | 2 | 3 | 4 | 5 |
|---|---|---|---|---|---|
| Temp. Rear Zone (° C.) | 266 | 266 | 266 | 266 | 266 |
| Temp. Middle Zone (° C.) | 277 | 277 | 277 | 277 | 277 |
| Temp. Front Zone (° C.) | 288 | 288 | 288 | 288 | 288 |
| Temp. Nozzle (° C.) | 244 | 244 | 244 | 244 | 244 |
| Actual Melt (° C.) | 289 | 289 | 289 | 289 | 289 |
| Fill time (s) | 1.33 | 1.03 | 1.3 | 0.9 | 1.49 |

TABLE 3

(Physical Properties)

| Physical Properties | ASTM | 1 | 2 | 3 | 4 | 5 |
|---|---|---|---|---|---|---|
| Tensile Strength (Mpa) | D-638 | 183.1 | 185.4 | 173.1 | 165.7 | 183.2 |
| Flexural Strength (Mpa) | D-790 | 291.5 | 291.1 | 282.8 | 267.6 | 292 |
| Flexural Modulus (Mpa) | D-790 | 9888.5 | 9864.9 | 9776.4 | 9247.3 | 9589.5 |
| Notched Izod Impact (J/m) | D-256 | 138.8 | 133.5 | 144.2 | 128.1 | 149.5 |
| Un Notched Izod Impact J/m) | D-256 | 1420.2 | 1468.2 | 1217.3 | 1105.2 | 1527 |
| Drop Weight Impact (J) | D-3029 | 3.14 | 2.63 | 1.9 | 1.81 | 3.62 |
| Melt Index (235° C./ 2160 g, g/10 m) | | 3.8 | 5.1 | 4.8 | 7 | 4.2 |
| Melt Index (235° C./ 2160 g, g/10 m) | | 11.3 | 15.8 | 14 | 20 | 12.1 |

EXAMPLE 7 (COMPARATIVE) AND 8–10

A series of experiments were run using nylon 6 (60.5, 53.5, 46.5, and 38%), glass fiber (35%), and additive (4.5%), and nylon 6,6,6 (produced from 70 weight percent caprolactam and 30 weight percent of hexamethylenediamine and adipic acid in a 1:1 ratio) at the levels of 0%, 7%, 14%, and 20%, respectively. Following dry blending, the ingredients were all fed into the throat of a 40 mm twin screw extruder, and the glass was fed downstream in extruder zone 6. The temperature profile for zones 1 to zone 10, rates, RPM, and torques, related to processing of these materials are comparable to those listed in Table 1 (Processing Conditions), column 1.

The extrudate from the twin screw machine was water quenched in an ambient water bath, air cooled, conveyed, and cut into pellets. The pellets were then dried overnight in a 49° C. oven and molded. A cover shield tool was used to evaluate the compositions for surface enhanced features, as in Examples 1 and 2. In this tool the composition containing the nylon 6,6,6 resin showed better surface, as envisioned by lesser degree of surface imperfections and glass, and also better flow, as can be seen by the extent of the filling. The observed surfaces from a mold filling and surface appearance perspective improved with the increased levels of nylon 6,6,6, can be correlated to the fill times listed. The part was molded on a Van Dorn 170 ton machine and the molding conditions are listed in Table 4 (Molding Conditions) under columns 1 to 4. The dry as molded physical properties obtained for these formulations are listed in Table 5, under the columns labeled 1 to 4.

TABLE 4

(Molding Conditions)

| | 1 | 2 | 3 | 4 |
|---|---|---|---|---|
| Temp. Rear Zone (° C.) | 241 | 241 | 241 | 241 |
| Temp. Middle Zone (° C.) | 314 | 314 | 314 | 314 |
| Temp. Front Zone (° C.) | 268 | 268 | 268 | 268 |
| Temp. Nozzle (° C.) | 273 | 273 | 273 | 273 |
| Actual Melt (° C.) | 278 | 278 | 278 | 278 |
| Fill time (s) | 1.53 | 1.08 | 0.96 | 0.71 |

TABLE 5

(Physical Properties)

| Physical Properties | ASTM | 1 | 2 | 3 | 4 |
|---|---|---|---|---|---|
| Tensile Strength (Mpa) | D-638 | 195.4 | 183.2 | 178.8 | 175.4 |
| Flexural Strength (Mpa) | D-790 | 300.6 | 299.5 | 295.4 | 294.7 |
| Flexural Modulus (Mpa) | D-790 | 9561 | 9834.8 | 9544.4 | 9826.3 |
| Notched Izod Impact (J/m) | D-256 | 149.5 | 138.8 | 138.8 | 133.5 |
| Un Notched Izod Impact (J/m) | D-256 | 1414.8 | 1617.7 | 1500.3 | 1382.8 |
| Drop Weight Impact | D-3029 | 4.47 | 4.61 | 3.39 | 3.39 |
| Melt Index (235° C./ 2160 g, g/10 m) | | 3.3 | 5.2 | 6.4 | 6.9 |
| Melt Index (235° C./ 2160 g, g/10 m) | | 11.2 | 16.3 | 18.2 | 22.3 |

As can be seen from the foregoing examples, the composition containing the nylon 6,6,6 resin according to the invention showed better surface as shown by a lesser degree of surface imperfections as well as better flow.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A nylon composition comprising a substantially uniform blend of:
    a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
    b) a second polyamide which is nylon 6 homopolymer, wherein the composition comprises from about 7 to about 20 weight percent of said first polyamide and from about 80 to about 83 weight percent of said second polyamide.

2. The nylon composition of claim 1 wherein the first polyamide is a nylon 6,6,6 copolymer formed from about 68 to about 72 weight percent of caprolactam and from about 28 to about 32 weight percent of hexamethylenediamine and adipic acid in a 1:1 ratio.

3. The nylon composition of claim 1 wherein the first polyamide is a nylon 6,6,6 copolymer formed from about 69 to about 71 weight percent of caprolactam and from about 29 to about 31 weight percent of hexamethylenediamine and adipic acid in a 1:1 ratio.

4. The nylon composition of claim 1 wherein the composition comprises from about 10 to about 18 weight percent of said first polyamide.

5. The nylon composition of claim 1 further comprising at least one filler.

6. The nylon composition of claim 5 wherein the filler comprises from about 7 to about 50 parts by weight of the composition.

7. A nylon article comprising a substantially uniform blend of:
   a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
   b) a second polyamide which is nylon 6 homopolymer, wherein the composition comprises from about 7 to about 20 weight percent of said first polyamide and from about 80 to about 83 weight percent of said second polyamide.

8. The nylon article of claim 7 wherein the first polyamide is a nylon 6,6,6 copolymer formed from about 68 to about 72 weight percent of caprolactam and from about 28 to about 32 weight percent of hexamethylenediamine and adipic acid in a 1:1 ratio.

9. The nylon article of claim 7 wherein the first polyamide is a nylon 6,6,6 copolymer formed from about 69 to about 71 weight percent of caprolactam and from about 29 to about 31 weight percent of hexamethylenediamine and adipic acid in a 1:1 ratio.

10. The nylon article of claim 7 wherein the composition comprises from about 10 to about 18 weight percent of said first polyamide.

11. The nylon article of claim 7 further comprising at least one filler.

12. The nylon article of claim 11 wherein the filler comprises from about 7 to about 50 parts by weight of the composition.

13. A method of forming a molded article comprising:
   i) forming a substantially uniform, molten nylon composition comprising a mixture of
      a) a first polyamide which is a nylon 6,6,6 copolymer formed from about 65 to about 75 weight percent of caprolactam and from about 25 to about 35 weight percent of hexamethylenediamine and adipic acid in a 1:1 ratio; and
      b) a second polyamide which is nylon 6 homopolymer, wherein the composition comprises from about 7 to about 20 weight percent of said first polyamide and from about 80 to about 83 weight percent of said second polyamide; and
   ii) molding said nylon composition to form an article.

14. The method of claim 13 wherein the molten nylon composition is formed by blending solid particles of each of said first and second polyamides to form a mixture of the particles and then heating said mixture to form a substantially uniform molten nylon composition.

15. The method of claim 13 wherein the molten nylon composition is formed by melting each of said first and second polyamides and then mixing said molten polyamides to form a substantially uniform nylon composition.

16. The method of claim 13 wherein the first polyamide is a nylon 6,6,6 copolymer formed from about 68 to about 72 weight percent of caprolactam and from about 28 to about 32 weight percent of hexamethylenediamine and adipic acid in a 1:1 ratio.

17. The method of claim 13 wherein the first polyamide is a nylon 6,6,6 copolymer formed from about 69 to about 71 weight percent of caprolactam and from about 29 to about 31 weight percent of hexamethylenediamine and adipic acid in a 1:1 ratio.

18. The method of claim 13 wherein the composition comprises from about 10 to about 18 weight percent of said first polyamide.

19. The method of claim 13 wherein said molding is conducted by injection molding.

20. The method of claim 13 wherein the nylon composition further comprises at least one filler.

* * * * *